United States Patent [19]

Giuffré et al.

[11] 4,132,819

[45] Jan. 2, 1979

[54] METHOD OF SHAPING AN ORGANIC POLYMER INSOLUBLE IN A POLAR SOLVENT

[75] Inventors: Luigi Giuffré; Placido M. Spaziante; Vittorio Pozzi; Giovanni Modica, all of Milan, Italy

[73] Assignee: Oronzio de Nora Impianti Elettrochimici S.p.A., Milan, Italy

[21] Appl. No.: 742,640

[22] Filed: Nov. 17, 1976

[30] Foreign Application Priority Data

Dec. 3, 1975 [IT] Italy ................................ 29951 A/75

[51] Int. Cl.$^2$ ............................................. B05D 3/10
[52] U.S. Cl. ..................................... 427/341; 204/296; 260/29.6 F; 260/29.6 SQ; 260/29.6 HN; 260/29.6 AT; 260/900; 427/244; 427/385 C; 427/390 R; 526/16; 526/55; 521/30; 521/27
[58] Field of Search ........... 427/243, 244, 341, 248 E, 427/385 C, 390 R; 204/296; 428/271; 260/29.6 HN, 29.6 AT, 2.1 E; 264/83, 183, 184; 526/53, 55

[56] References Cited

U.S. PATENT DOCUMENTS

2,921,920  1/1960  Smith et al. .................. 260/29.6 AT
3,257,334  6/1966  Chen et al. ............................ 260/2.1

OTHER PUBLICATIONS

Hawley, *The Condensed Chemical Dictionary*, 1974, Van Nostrand Reinhold Co., New York, pp. 96, 515.

*Primary Examiner*—Ronald H. Smith
*Assistant Examiner*—Evan K. Lawrence
*Attorney, Agent, or Firm*—Hammond & Littell

[57] ABSTRACT

A method of shaping an organic polymer insoluble in a polar solvent comprises reacting an insoluble organic polymer containing at least one Lewis acidic electron attracting group or Lewis basic group with a sufficient amount of a lower alkylene oxide to alkoxylate the Lewis group and form an alkoxylated product soluble or easily dispersible in a polar solvent, dissolving or dispersing the alkoxylated product in a polar solvent, shaping the alkoxylated product into the desired form by applying the solution or dispersion to a support and removing the polar solvent, and hydrolyzing the alkoxylated product to obtain the original polymer in the desired form. Products made by this process include self-supporting polymeric films and porous diaphragms for electrolytic cells made by impregnating suitable porous supports with the alkoxylated product.

10 Claims, No Drawings

METHOD OF SHAPING AN ORGANIC POLYMER INSOLUBLE IN A POLAR SOLVENT

BACKGROUND OF THE INVENTION

1. Field of the Invention

The present invention relates to a method of shaping an insoluble organic polymer into a desired form by rendering it temporarily soluble during the shaping process.

2. Background of the Invention

Films and membranes of polymers insoluble in polar solvents are obtainable at present by methods such as hot lamination, pressing and/or sintering, a typical example of which is the formation of sheets of polytetrafluoroethylene (PTFE). Such methods are somewhat sophisticated and require the availability of expensive apparatus. A variety of sulfonated and sulfonable polymers suitable for the preparation of ion-selective membranes or of porous diaphragms with enhanced ion-selective properties have been recently developed in the field of electrodialysis and electrolysis. For example, in electrolytic cells, a typical example of which are cells for the electrolysis of alkali metal chlorides, the membrane or diaphragm must be resistant to an environment that is particularly hostile to polymeric compounds, such as the exposure to a very high pH and to chlorine. In general, hydrocarbon polymers are totally unsatisfactory for this use and copolymers of a halogenated monomer and a monomer containing polar groups are usually suggested. However, such polymers are generally insoluble in polar and non-polar solvents and their formation into very thin sheets or their application onto inert support materials such as asbestos, for example, by means of impregnation, has proved to be difficult.

SUMMARY OF THE INVENTION

It is an object of the invention to provide a novel method of reversibly rendering soluble or easily dispersible in a polar solvent substantially insoluble polymers.

It is a further object of the invention to provide novel methods of forming insoluble organic polymers into self-supporting films or impregnating porous materials with said polymers.

These and other objects and advantages of the invention will become obvious from the following description.

The novel method of the invention comprises reacting an insoluble organic polymer containing at least one Lewis acidic electron attracting group with a sufficient amount of a lower alkylene oxide to alkoxylate the Lewis acidic electron attracting group, dissolving or dispersing the resulting alkoxylated product in a polar solvent, shaping the resulting product into the desired form by applying it to a support and removing the polar solvent, and subjecting the alkoxylated product to hydrolysis to revert to the original polymer in the desired form.

DESCRIPTION OF THE PREFERRED EMBODIMENTS

The process is applicable to a wide range of copolymers and homopolymers and is generally useful with any polymer containing a Lewis acid or base group. Examples of suitable copolymers are copolymers of a monomer containing carboxylic groups or groups convertible thereto such as acrylic acid, crotonic acid, acrylic acid chloride, vinyl acetate, acrylonitrile, acrylamide, etc. with a second monomer such as tetrafluoroethylene, chlorotrifluoroethylene, bromotrifluoroethylene, vinyl fluoride, vinylidene fluoride, hexafluoropropylene, etc. Also useful are copolymers of a monomer containing a benzene ring such as styrene with a monomer such as divinylbenzene, trifluorochloroethylene, vinylidene fluoride, vinylidene chloride, etc. which copolymer is sulfonated or aminated on the styrene benzene moiety to introduce the Lewis acid or base group needed for alkoxylation of the polymer.

The method of the invention is particularly useful with the polymers described in commonly assigned U.S. patent application Ser. No. 632,056 filed Nov. 14, 1975, now U.S. Pat. No. 4,060,473, which are sulfonated copolymers of (A) a monomer of the formula

wherein X is an electron attracting group and Y is selected from the group consisting of hydrogen, methyl and ethyl and (B) a fluorinated monomer of the formula

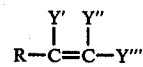

wherein R is selected from the group consisting of hydrogen, halogen and alkyl of 1 to 4 carbon atoms optionally halogenated and Y', Y'' and Y''' are individually selected from the group consisting of hydrogen and halogen with the proviso that at least one of the Y's is fluorine.

Examples of suitable groups for X are —COOH, $CONH_2$, —COOR' where R' is lower alkyl of 1 to 7 carbon atoms, OR'' is lower alkyl of 1 to 7 carbon atoms, —COX' wherein X' is a halogen such as chlorine, —CN and a halogen such as chlorine, bromine or iodine. Examples of specific compounds are acrylic acid, crotonic acid, acrylic acid chloride, vinyl acetate, acrylonitrile, acrylamide, etc.

Examples of suitable fluorinated monomers of formula II are tetrafluoroethylene, chlorotrifluoroethylene, bromotrifluoroethylene, vinylfluoride, vinylidenefluoride and hexafluoropropylene, etc. One of the preferred copolymers is a copolymer of acrylic acid and tetrafluoroethylene.

After copolymerization of the halogenated monomer and the monomer having at least one hydrogen atom α to the electron attractor group, the intermediate copolymers which are also a part of the invention are sulfonated which results in a polymer material having strongly negative polar characteristics, excellent mechanical and chemical stability and good wettability by aqueous electrolytes. The polymers are particularly suitable for use as diaphragm material in electrolysis cells, particularly for the electrolysis of aqueous alkali metal halide solutions. The strongly negative groups within the copolymer oppose the back migration of hydroxyl ions from the cathode compartment to the anode compartment.

In the copolymers of the invention, the molar ratio of the monomer having at least one hydrogen atom α to the electron attracting group to the halogenated monomer is selected so that the sulfonated copolymer has the required wettability and negative polarity while retaining the desired mechanical and chemical stability. The said molar ratio of monomer of formula I to monomer of formula II may be between 2.5:1 to 42:1, preferably 7:1 to 25:1. The molecular weight of the sulfonated copolymer is between $2 \times 10^4$ to $4 \times 10^6$, preferably $2 \times 10^5$ to $2 \times 10^6$.

The latter copolymers are particularly suitable for the preparation of cationic membranes and diaphragms with a high degree of electronegativity usable in electrolytic cells for the electrolysis of brines and other alkali metal salt solutions.

The presence of an electron-attracting group in the (A) type monomer allows in fact the introduction, in α-position with respect to the carboxyl, of —$SO_3H$ acid groups by a sulfonation process of the copolymer, conferring highly ion-selective properties upon it. Such copolymers prove to be insoluble in solvents such as water, alkanols like methanol, ethanol or propanol, esters or ketones like acetone, methyl ethyl ketone or mixtures thereof and the impregnation of porous supports such as asbestos paper or cloth with said copolymers to obtain porous diaphragms having a high mechanical stability and with high ion-selective properties usable in electrolytic cells presents remarkable difficulty.

One of the prior art methods followed was that of spreading the copolymer in the form of a fine powder on the asbestos paper and of subjecting the paper to pressing at a temperature varying between 200 and 300° C. This method, like other methods used, for example the deposition of the diaphragm on the cathode mesh by means of the aspiration of a suspension of asbestos fibers and copolymer powder followed possibly by heat treatment, presents disadvantages. For instance, lack of uniformity in both the porosity characteristics and in those of ion-selectivity on the whole surface of the diaphragm as well as the stability and mechanical resistance of the diaphgram are varied.

Such disadvantages are overcome by using the method of the present invention inasmuch as the presence of acid groups like —$SO_3H$ and/or COOH allows alkoxylation of the copolymer, and the copolymer which has been made soluble or easily dispersible in a polar solvent can be applied onto the asbestos support with very satisfying results by various techniques such as impregnation or spraying followed by the removal of the solvent and the destruction of the polyoxide chain by means of acid or alkaline hydroylsis.

Alkoxylation of Lewis acidic and basic groups such as alcohols, carboxyl group, sulfonic acid groups, amines, etc. is known to give a molecule with a primary hydroxyl group according to the following reaction scheme

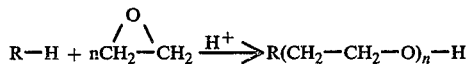

The reaction may be catalyzed by acids or bases such as alkali metal and alkaline earth metal hydroxides, oxides or alkoxides, tertiary aliphatic amines such as triethylamine, zinc oxide, sulfuric acid, stannic chloride, boron trifluoride, etc.

The lower alkylene oxides are those of 1 to 5 carbon atoms although the most commonly used are ethylene oxide and propylene oxide and mixtures thereof. The number of moles of alkylene oxide used will vary depending upon the particular copolymer but is between 5 and 1000, preferably 150 to 300 moles of alkylene oxide per mole of polymer unit containing one reactive group.

The alkoxylation reaction may be effected at atmospheric pressure or under a gauge pressure of 1 to 15, preferably 1.5 to 3 atmospheres. If a basic catalyst is used, the reaction temperature is preferably 120 to 200° C. and if an acid catalyst is used, the reaction temperature is 55 to 70° C.

The alkoxylated copolymers are soluble or dispersable in water at room temperature and are soluble in various polar organic solvents. Their high wettability and/or solubility of the polymers make possible their application on suitable supports by simple techniques such as painting, impregnation of porous material and spreading. Thin films of the polymers can be effected simply by applying a layer of a solution or dispersion of the alkoxylated polymer on a suitable support, removing the solvent and treating the alkoxylated polymer with and acid or alkaline agent to remove the alkoxy group from the polymer which then has its original characteristics.

For example, the copolymer obtained by means of copolymerization of acrylic acid and tetrafluoroethylene as described in U.S. patent application 632,056 referred to above pressure carboxyl groups in a chain which contain an hydrogen atom sufficiently mobile to act as a polymerization initiator for ethylene oxide according to the following diagram:

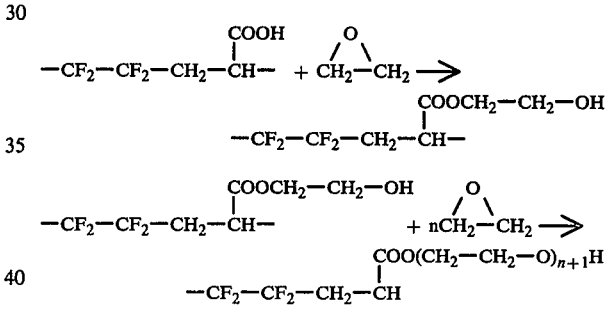

The thus modified polymer presents, unlike the initial polymer, good solubility characteristics in polar solvents due to the presence of the hydrophile chain of polyethyleneoxide and can be easily used to impregnate different kinds of supports (asbestos diaphragm, PTFE meshes, etc.), to obtain diaphragms and membranes.

After the application of the polymer and evaporation of the polar solvent, the ester linkage between the polyethyleneoxide chain and the carboxyl of the acrylic acid can be easily hydrolyzed by treatment with an alkali, in particular with $NH_3$ either in the anhydrous form or in the presence of water vapor, in molar ratios close to unity so as to give back to the copolymer its initial characteristics of insolubility.

At this point, intervention may be made with the reaction of sulfonation on the hydrogen α to the carboxyl group of the copolymer by introducing polar groups that confer properties of wettability and ion-selectivity on the copolymer, as described in the U.S. patent application. The alkoxylation procedure can also occur after the sulfonation reaction, and in this case, the polar groups containing H that are sufficiently mobile to act as initiators for the polymerization of the ethylene oxide are both —$SO_3H$ and COOH groups.

Typical examples of the method of the present invention applied to polymers containing Lewis alkaline polar groups are represented by the treatment of the copolymer of styrenedivinylbenzene containing primary amine groups or of the copolymer obtained by graph copolymerization by radical chain transfer between a copolymer of vinylidene fluoride and tetrafluoroethylene with vinyl pyridine. For example, the copolymer of styrenedivinylbenzene containing primary amine groups is made to react with ethylene oxide according to the following reaction:

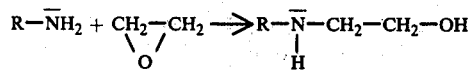

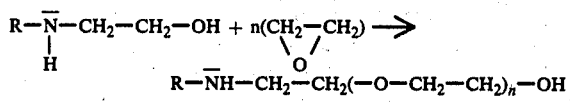

wherein R is the residue of the copolymer of styrene-divinylbenzene.

The thus ethoxylated copolymer proves to be soluble in water and can be made insoluble again by treatment with an alkali, for example ammonia either in the anhydrous form or in the presence of water vapor, accoring to the reaction

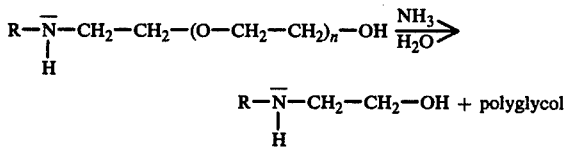

In this case, starting from a polymer containing a primary amine as basic group, the polymer is found to contain secondary amine groups formed by each amino group having attached thereto one alkoxy group after the solubilization and insolubilization procedures.

In the following examples there are described several preferred embodiments to illustrate the invention. However, it is to be understood that the invention is not intended to be limited to the specific embodiments.

EXAMPLE 1

A mixture of 10 g of a finely-divided sulfonated copolymer of tetrafluoroethylene-acrylic acid with a molar ratio of tetrafluoroethylene to acrylic acid of 10:1, 300 ml of p-xylene and 0.2 ml of tributylamine catalyst was placed in a 500 ml glass reactor provided a reflux condensor provided with a heating sleeve and regulated with a thermostat and the mixture was heated to 120° C. 50 liters of ethylene oxide were bubbled through the mixture over 6 hours at 120° C. and the heating at 120° C. was continued for 2 hours. The mixture was dried and the residue of the ethoxylated sulfonated copolymer was water soluble.

A sheet of asbestos paper 20 × 20 × 0.5 mm was immersed in an aqueous solution containing 280 g liter of the ethoxylated sulfonated copolymer and the solution impregnated asbestos paper was dried in air at 110° C. A stream of water vapor and ammonia at 80° C. was passed through the dried asbestos paper impregnated with the ethoxylated sulfonated copolymer for 30 minutes and the resulting paper was washed with water and dried to obtain an asbestos paper weighing 0.015 g/cm$^2$ more than the initial asbestos sheet.

The resulting asbestos sheet was used as a diaphragm in an electrolysis cell for the electrolysis of brine containing 320 g/l of sodium chloride. The anode was a titanium base with an electrocatalytic coating of mixed oxides of titanium and ruthenium and the cathode was steel mesh. The current density with respect to the diaphragm surface was 1000 A/m$^2$ and the cell voltage was 3.2 volts. The hydrostatic pressure on the diaphragm was 60 cm and the electrolyte temperature was 80° C. The composition of the catolyte was 140 g/l of sodium hydroxide, 115 g/l of sodium chloride and 0.5–1 g/l of sodium chlorate and the Faraday efficiency was 91%. The diaphragm was in good condition even after more than 48 hours of operation and most significant is the fact that the diaphragm did not swell.

EXAMPLE 2

A mixture of 10 g of finely divided sulfonated copolymer of tetrafluoroethylene-acrylic acid as in Example 1, 300 ml of benzene and 0.2 ml of 100% sulfuric acid was heated in the glass reactor described in Example 1 to 70° C. and 50 liters of ethylene oxide were bubbled through the mixture at 70° C. for 7 hours. The mixture was then heated for another 2 hours at 70° C. and the benzene was evaporated under reduced pressure to obtain a water-soluble ethoxylated sulfonated copolymer. The said polymer was suitable for impregnating asbestos paper as in Example 1.

EXAMPLE 3

Using the procedure of Example 1, 10 g of a styrene-divinybenzene copolymer containing 2.3 m equivalents of primary amino groups per ml of resin (density = 0.8), 300 ml of p-xylene and 0.2 ml of tributylamine as catalyst were heated in the reaction to 120° C. and 50 l of ethylene oxide (measured at room temperature) was bubbled through the mixture at 120° C. over 10 hours. The mixture was heated for an additional 2 hours at 120° C. to obtain the said copolymer ethoxylated which was water-soluble. The said ethoxylated copolymer was used to impregnate an asbestos sheet as in Example 1.

EXAMPLE 4

Using the procedure of Example 3, 10 g of the same copolymer, 300 ml of benzene and 0.2 ml 100% sulfuric acid were ethoxylated at 70° C. to obtain the water-soluble ethoxylated copolymer.

Various modifications of the compositions and methods of the invention may be made without departing from the spirit or scope thereof and it is to be understood that the invention is intended to be limited only as defined in the appended claims.

What is claimed is:

1. A method of shaping an organic polymer insoluble in a polar solvent comprising reacting an insoluble organic polymer containing at least one electron attracting group with a sufficient amount of a lower alkylene oxide to alkoxylate the electron attracting group to a degree sufficient to make the alkoxylated product soluble or easily dispersible in a polar solvent, dissolving or dispersing the resulting alkoxylated product in a polar solvent to obtain a solution or dispersion, shaping the resulting product into the desired form by applying the said solution or dispersion to a support and removing the polar solvent, and subjecting the alkoxylated product to hydrolysis to obtain the original polymer in the desired form.

2. The method of claim 1 wherein the alkylene oxide is ethylene oxide, propylene oxide or mixtures thereof.

3. The method of claim 1 wherein 5 to 1000 moles of alkylene oxide are used per mole of polymer unit containing one electron attracting group.

4. The method of claim 1 wherein the solution or dispersion of the polymer is applied to a porous support and the solvent is evaporated so that the support is impregnated with the alkoxylated product.

5. The method of claim 4 wherein the support is made of material resistant to conditions found in electrolytic cells.

6. The method of claim 5 wherein the support is made of asbestos.

7. The method of claim 5 wherein the support is made of tetrafluoroethylene cloth.

8. The method of claim 1 wherein the polymer is a sulfonated copolymer of (A) a monomer of the formula

Y—CH=CH—X wherein X is an electron attracting group and Y is selected from the group consisting of hydrogen, methyl and ethyl and (B) a fluorinated monomer of the formula $$R-\underset{\underset{Y'}{|}}{C}=\underset{\underset{Y''}{|}}{C}-Y'''$$

wherein R is selected from the group consisting of hydrogen, halogen and alkyl of 1 to 4 carbon atoms optionally halogenated and Y', Y" and Y''' are individually selected from the group consisting of hydrogen and halogen with the proviso that at least one of the Y's is fluorine.

9. The process of claim 8 wherein the molar ratio of monomer A to monomer B is 2.5 to 1 to 42:1.

10. The method of claim 8 wherein the sulfonated copolymer has a molecular weight of $2 \times 10^4$ to $4 \times 10^6$ and the molar ratio of monomer A to monomer B is 7:1 to 25:1.

* * * * *